United States Patent [19]

Sadamune et al.

[11] Patent Number: 4,887,190

[45] Date of Patent: Dec. 12, 1989

[54] HIGH INTENSITY FIBER OPTIC LIGHTING SYSTEM

[75] Inventors: Dean J. Sadamune; Shawn J. Fagen, both of Santa Monica, Calif.

[73] Assignee: In Focis Devices Inc., Beverly Hills, Calif.

[21] Appl. No.: 253,496

[22] Filed: Oct. 15, 1988

[51] Int. Cl.[4] .............................................. F21V 7/04
[52] U.S. Cl. ..................................... 362/32; 362/261;
362/268; 362/283; 350/96.1; 350/96.18
[58] Field of Search ................. 362/32, 261, 268, 283;
350/96.1, 96.18, 96.24

[56] References Cited

U.S. PATENT DOCUMENTS

| | | | |
|---|---|---|---|
| 3,114,283 | 12/1963 | Gruner | 88/24 |
| 3,596,083 | 7/1971 | Lovering | 362/32 |
| 4,048,486 | 9/1977 | Kreege | 240/1 R |
| 4,476,519 | 10/1984 | Hayamizu | 362/32 |
| 4,497,013 | 1/1985 | Ohta | 362/32 |
| 4,519,017 | 5/1985 | Daniel | 362/32 |
| 4,639,837 | 1/1987 | Yokota | 362/32 |
| 4,747,648 | 5/1988 | Gilliland, III | 362/32 X |
| 4,757,431 | 7/1988 | Cross | 362/261 |
| 4,757,462 | 7/1988 | Schelley | 362/20 |
| 4,811,172 | 3/1989 | Davenport et al. | 362/32 X |

Primary Examiner—Stephen F. Husar
Attorney, Agent, or Firm—James V. Harmon

[57] ABSTRACT

A high intensity fiber optic lighting system is described utilizing an incoherent light source, e.g. a xenon arc lamp having a pair of aligned electrodes positioned on the optic axis of a non-spheric reflector such as a parabolic reflector so that the forward electrode will not obstruct the transmission of light from the light source and reflector. The arc of the lamp is located at the focal point of the reflector. A condensor assembly which can comprise a pair of planoconvex lenses is positioned to receive incident rays from the reflector and direct them to a focal point located at the polished entry end of a bundle of optic fibers composed of a plurality of peripheral fibers surrounding a central fiber, all held together at the focal point of the condensing lens. The fibers at the opposite end of the fiber bundle diverge and are separated from one another so as to be freely movable and independently positionable at different locations, such as different positions and elevations on a stage for special lighting effects. A columnating lens is located to receive light from the outlet end of each fiber.

14 Claims, 3 Drawing Sheets

HIGH INTENSITY FIBER OPTIC LIGHTING SYSTEM

FIELD OF THE INVENTION

The present invention relates to lighting systems and more particularly to a high intensity lighting system utilizing fiber optics.

BACKGROUND OF THE INVENTION

Previous high intensity special effects lighting systems that employ fiber optics have been inefficient with respect to the amount of optic power produced, expensive and have suffered from other difficulties such as the overheating of fibers in the optic system. Moreover, previous systems have not provided the power output required. For example, there is a demand for a fiber optic lighting system which can provide over 250 milliwatts of optic output from a single output or fiber end. Present commercially available systems utilizing multiple fibers usually provide only a small fraction of this amount of power. By contrast, the present invention is capable of producing over 1 watt of optical power and often about 1.8 watts of optical power. The optical power output of a typical system in accordance with the invention is about 10 times the power output of lighting systems now being used commercially in the entertainment industry as a compact system for the purpose of providing special effects.

The resulting intense beams of incoherent light are excellent for a variety of applications including stage show lighting, trade show lighting, the lighting of fountains or other displays, as well as in conjunction with musical performances, night club acts, discos and the like. The invention can also be used in biomedical lighting for illuminating parts of the body. The light source or light box is also very compact and capable of being placed anywhere desired, e.g. behind or under a stage.

The invention has the following additional characteristics. More individual fibers of the fiber bundle can be moved independently to various locations on a stage or can extend vertically to the ceiling. The outlet end of each fiber can be housed in a modulation device for imparting color or for reflecting the high intensity beam of light in various directions as desired. The separate fibers can be easily handled and moved to new locations on a stage or elsewhere as required. In medical applications a fiber can be threaded through an instrument for illuminating the body with an intense beam of light.

More specific objects of the present invention will be apparent in view of the following detailed description setting forth by way of example but a few of the various embodiments of the invention that will be aparent to those skilled in the art once the principles described herein are understood.

SUMMARY OF THE INVENTION

The light source provided is an incoherent source of light such as an incandescent lamp or arc light. The light source includes a pair of electrodes including at least one forward electrode. A non-spheric curved reflector of three-dimensional configuration is provided adjacent to the light source. The curved reflector has as a line of symmetry an axis of elongation defining an optic axis for the reflector which contains a focal point. At least the forward electrode coincides with and is aligned along the optic axis of the reflector. The light source is located substantially at the focal point of the reflector so that the reflector intercepts and reflects at least about 40% and usually over 50% of the light rays from the light source. The reflected rays are directed forwardly past the forward electrode and are at least generally in alignment with the optic axis of the reflector. A condensing lens is positioned to receive the generally aligned reflected rays for focusing them to a point. An optical fiber having an input or entry end has its own longitudinal axis aligned with the reflector optic axis and is positioned substantially at the focal point of the light from the condensing lens. The optical fiber has an outlet end which acts as an artificial point source of light for a columnating lens. The columnating lens is positioned to receive light from the artificial point source and is spaced from it by a distance which is equal to the focal length of the columnating lens to provide a columnated high intensity light beam for illuminating purposes.

THE FIGURES

DETAILED DESCRIPTION OF THE INVENTION

In accordance with the present invention a high intensity light source such as an arc light or incandescent light source is employed. An arc light, such as a xenon or mercury arc light is preferred. Of these, a xenon arc light is considered to be the best. This incoherent light source includes a pair of electrodes, e.g. a cathode and an anode spaced apart from one another and enclosed in a controlled atmosphere. The non-spheric curved reflector adjacent to the incoherent light source has an axis of elongation that serves as an optic axis containing a focal point. The best reflectors are either ellipsoids or paraboloids. Of these reflectors, an elliptical reflector will image the light source without as much paraxial aberration as a parabolic reflector. However, a parabolic reflector will have the advantage of reflecting more rays forwardly in general alignment with the optic axis, even when striking the reflector at a right angle to the optic axis. A degree of convergence can be tolerated provided that the reflector intercepts at least about 40% of the light from the light source and reflects the intercepted light at least generally in alignment with the optic axis of the reflector.

The light from the reflector is directed into a condensing lens assembly which preferably comprises a pair of plano-convex lenses having their convex surfaces facing toward one another. Other forms of condensing lenses can however be employed. One example is a gradient index lens wherein the lens surfaces are computer generated. The condensing lens functions to focus the reflected rays to a concentrated point or spot. The plano-convex lens assembly was found to be substantially more efficient than aspheric lenses previously employed since rays striking the periphery are focused more efficiently and produce less chromatic aberration than is produced with aspheric lenses previously used. Accordingly, more of the light is focused to a high intensity focal point spot wherein the inlet or entry end of a single fiber or fiber bundle is located. In this way substantially more of the optical power is transferred to the fiber optic bundle.

Fiber optics consist of one or more optic fibers enclosed in a protective casing. In a typical application at least about 200 milliwatts and up to 500 milliwatts of optical power is transmitted through each fiber. The outlet end of the fiber or fibers is located at a remote point where the illumination is required. It functions as an artificial point source of light positioned at the focal point of a columnating lens. The columnating lens is spaced from the fiber by a distance equal to its focal length to thereby columnate the rays from the artificial point source. One preferred columnating lens is a color-corrected, i.e. achromatic doublet.

Refer now to the drawings which illustrate a typical application of the invention for special effects lighting such as stage lighting.

Figures 1, 2:
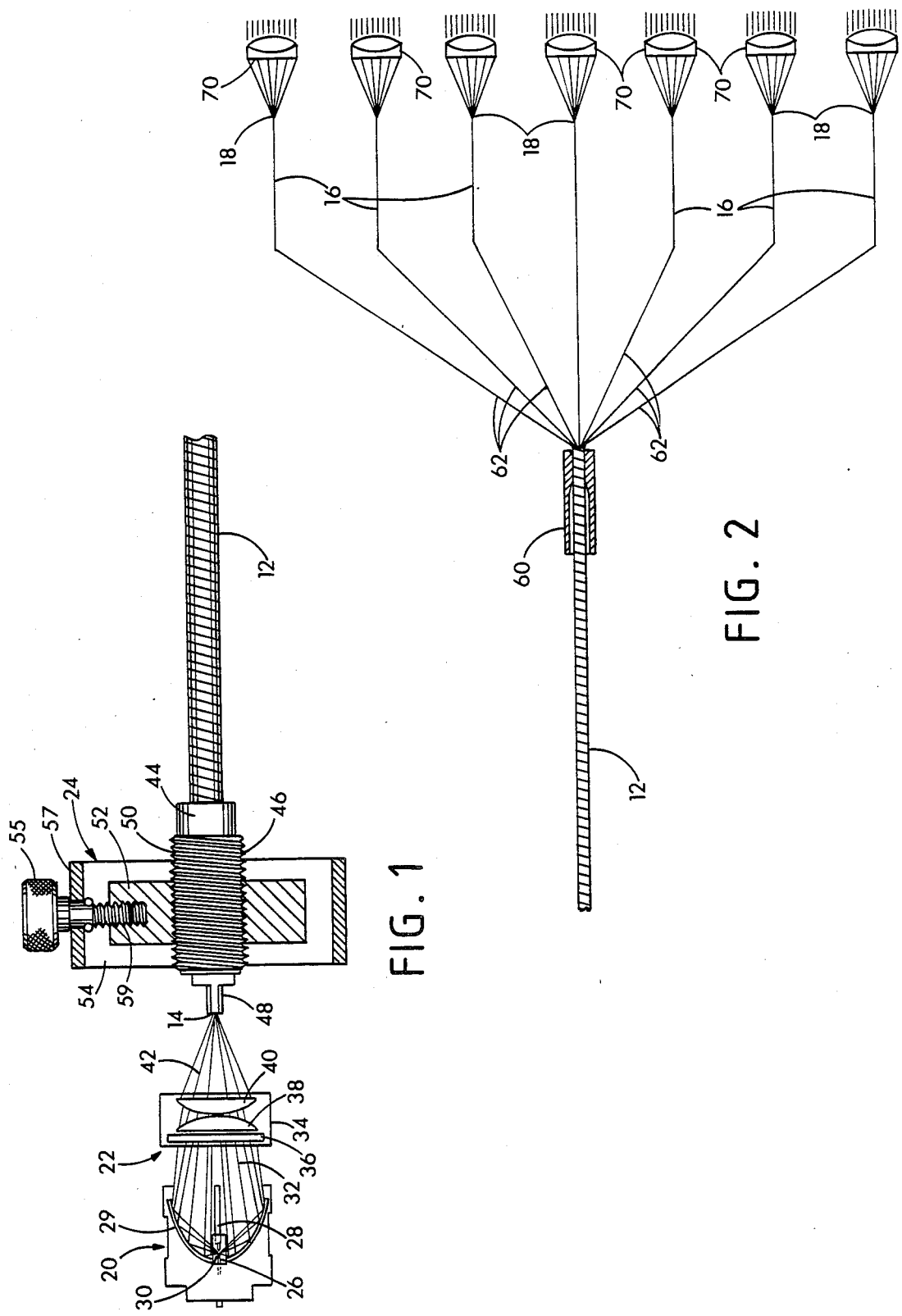
FIG. 1 is a diagrammatic representation of the light source, condensing lens and inlet end of the fiber optic bundle.
FIG. 2 is a diagrammatic representation of the outlet end of the fiber bundle shown in FIG. 1.
Figure 3:
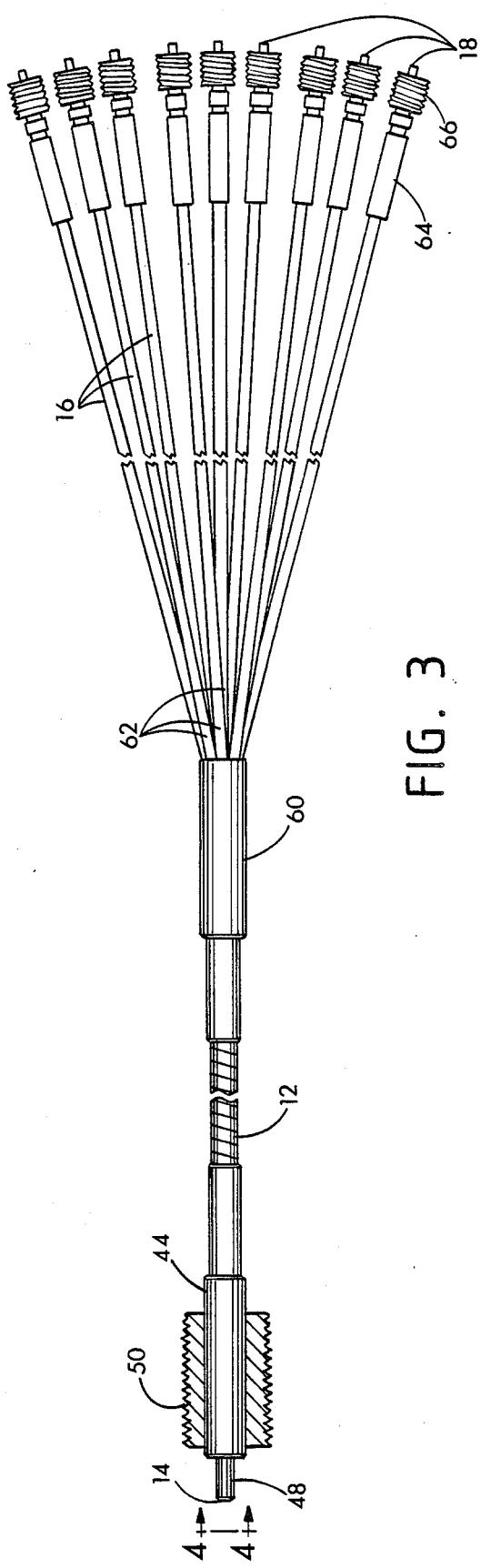
FIG. 3 is a semi-diagrammatic representation of the fiber optic bundle foreshortened for clarity of illustration.

Shown in FIG. 1 is a high intensity fiber optic lighting system 10 having a fiber bundle 12, a high intensity light source such as a xenon arc lamp 20, a condensing lens assembly 22, and a fiber optic coupler mount 24.

Figure 5:
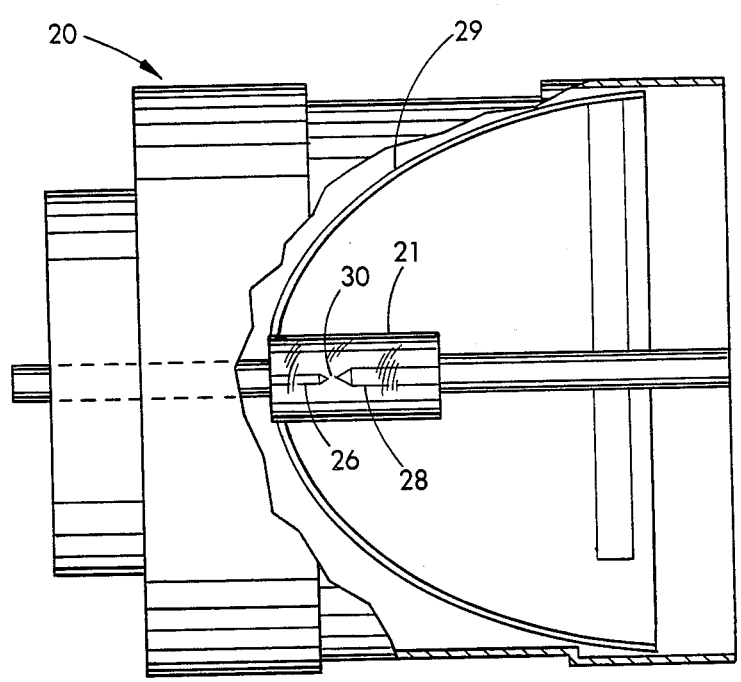
FIG. 5 is a semi-diagrammatic representation of the light source.

The light source includes an anode 26 and a coaxial cathode 28 in alignment with the anode and located on the central axis of symmetry of a paraboloid reflector 29. The light source 30, i.e. the arc between the electrodes 26 and 28 is located at the focal point of the parabolic reflector 29 to focus reflected rays indicated at 32 past the forward electrode 28 along somewhat converging paths but at least generally in alignment with the optic axis (axis of symmetry) of the reflector 29 which coincides with the axis of the forward electrode 28. The entire lamp 20 can be sealed, evacuated and/or filled with a gas such as xenon or, if desired the gas can be contained in a glass envelope 21 enclosing only the ends of electrodes 26 and 28 (FIG. 5).

The condensing assembly 22 includes a pair of plano-convex lenses 38, 40 in this case having a combined focal length of 20 millimeters and positioned 20 millimeters from the light source 30 and 20 millimeters from the inlet or entry end of the fiber bundle 12. The condensing lenses 38, 40 thus focus the rays to a concentrated light spot or focal point 14 which coincides with the entry end of the fiber bundle 12. The condensing assembly 22 also includes a heat reflector or "hot mirror" 36. The hot mirror at 36 is preferably placed ahead of the condensing lenses to protect them from overheating. Accordingly, most of the heat is prevented from entering the plano-convex condensing lenses 38, 40 so that only visible light rays 42 are focused at point 14.

The fiber bundle 12 is held at its left end in a guide or supporting sleeve 44 that extends through the center of a threaded fiber optic coupler 50. Fiber optic coupler 50 is screw-threaded into a coupler mounting block 52. This permits axial adjustment of the fiber to allow precise positioning of the entry end of the bundle 12 at the light spot 14. The coupler mount 52 is also supported for lateral sliding movement in a central opening within a bracket 57 and is connected to an adjustment knob 55 by means of threaded connector 59. By turning the knob 55 the threaded connection at 59 with the fiber optic coupler mount 52 enables the end of the fiber optic bundle 12 to be shifted laterally to align it with the light spot at 14. The fiber bundle extends from the adjustable mount 24 toward the right in the Figure and is provided with a suitable shield such as a plastic wrap for protection.

Figure 4:
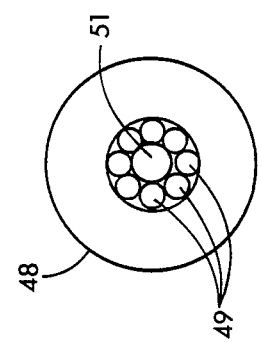
FIG. 4 is a greatly enlarged end view of the fiber bundle of FIG. 3.

Referring now to FIG. 4, it will be seen that nine optic fibers are provided including eight peripheral fibers 49 and a central fiber 51 within the bundle 12. The polished end of the bundle 12 is contained in an integral extension 48 of the sleeve 44. The fiber bundle 12 in this case comprises eight fibers of 600 microns diameter and a central fiber 51 of 1,000 microns in diameter embedded in an epoxy matrix. If seven peripheral fibers 49 are provided the fiber bundle 12 will have an approximate diameter of 1.8 mm. If nine fibers are provided as shown, the bundle 12 will have an approximate diameter of about 2.2 mm. During operation it has been found that the peripheral fibers 49 can carry 200 milliwatts and the central fiber 51 can carry 400 to 500 milliwatts, for a total optical power of 2 watts of visible light. The intensity of this light is extraordinary.

At the right end of the bundle 12 is provided an enclosure or furcator 60 in which the individual fibers 62 diverge to provide separate fiber ends at 16. The length of the cable 12 between the furcator 60 and the sleeve 44 can be a few feet long, e.g. 2.5 feet long, while the separated individual fibers 16 are typically much longer, e.g. 18 feet long. The free end of each of the fibers 16 is enclosed in a protective casing or sleeve 64 to which is connected a threaded coupling 66 through which the polished outlet end 18 of the fiber 16 extends. The fibers 16 are of course suitably protected with a surface coating or wrap of the type commonly used in the art and are flexible so that they can be placed wherever desired and moved from time to time as needed.

The specifications for the lenses are chosen to maximize efficient optical power transmission for fiber bundles of different face widths, different configurations and having different numbers of fibers. For example, the width of the light spot or focal point can be increased if the face width of the inlet end of the fiber bundle is increased.

Refer now to FIG. 2 which illustrates the free outlet ends 18 of the fiber 16, each aligned at the focal point of a columnating lens system which in this case comprises a doublet 70 composed of a 30 mm lens having an 85 mm focal length to columnate the beam as shown at 80.

Figure 6:
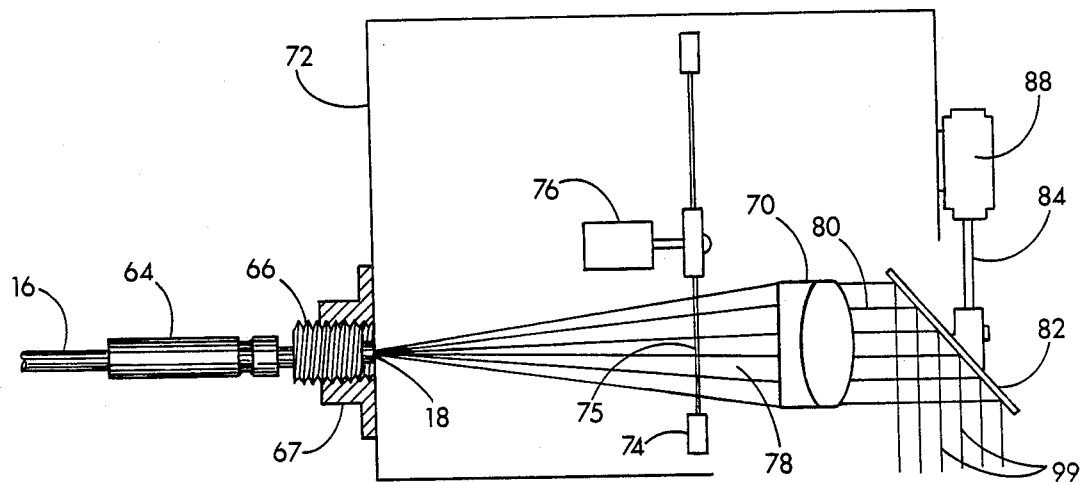
FIG. 6 is a diagrammatic representation of a typical light modulation assembly employed in some applications.

As shown in FIG. 6, the polished outlet end 18 of one fiber 16 is held in a retaining member 67 by means of a threaded fitting 66 for certain applications in what can be referred to as a modulator 72. In this case the modulator includes a color wheel 74 containing various transparent colored plates 75 supported for rotation on a drive motor 76 to bring various colors into alignment with the rays 78. The end of the fiber optic bundle acts as a high intensity artificial light source from which the rays 78 diverge. After passing through the color wheel 74, the light columnated by the achromatic lens 70 provides parallel rays at 80 which, depending upon the application, can be used to strike a mirror 82 mounted for rotation on a shaft 84 of motor 88. During operation of the motor 88 rays 99 are reflected in various directions to create special effects by sweeping the highly columnated intense beam of light in various directions to produce special effects. In other applications different columnating lenses 70 can be employed. For example a 40 mm lens with a 120 mm focal length can be used, if desired. For biomedical applications the columnating lens 70 can reduced in size. The numerical aperture of each fiber is selected to correspond with the combined focal length of the condensing optics so that the numerical aperture of the fiber is as close as possible to the numerical aperture of the condensing lens. The numerical aperture of the fiber at outlet 18 is about 0.4. In order to collect all of the light, ideally lens 70 should have an f-number of about 1.25 which corresponds to a numerical aperture of 0.4. For practical use a lens 70 having an f-number of about 2 to 3 can be employed. Similarly, the numerical aperture of the inlet end of bundle 12 should be as close as possible to that of the condensing lens assembly.

The invention is capable of producing a highly effective intense light with several outlet ends that can be moved easily from one place to another as required and can be mounted almost anywhere on a stage. Using nine fibers, the invention produces several times more power than is currently available. The beams produced are highly columnated and carry well over long distances to produce a striking visual effect.

What is claimed is:

1. A high intensity fiber optic lighting system comprising an incoherent light source having a pair of electrodes including at least one forward electrode, a nonspheric curved reflector of three-dimensional configuration having as a line of symmetry an axis of elongation defining an optic axis for the reflector containing a focal point, at least the forward electrode being aligned along said optic axis and the light source being located substantially at the focal point of the reflector whereby the reflector intercepts light rays from the light source and reflects the intercepted rays forwardly at least in general alignment with the optic axis of the reflector, a condensing lens assembly positioned to receive the generally aligned reflected rays and to focus them to a focal point, at least one optical fiber having an inlet end with a longitudinal axis aligned or parallel to the optic axis of the reflector and positioned substantially at the focal point of the rays passing through the condenser, said fiber also having an outlet end providing an artificial point source of light located at said outlet end of the fiber, a columnating lens positioned to receive light from the artificial point source and spaced therefrom by a distance equal to its focal length to thereby produce a high intensity columnated light beam for illuminating purposes.

2. The high intensity fiber optic lighting system of claim 1 wherein the incoherent light source comprises a xenon arc lamp including spaced apart coaxial anode and cathode both aligned with the axis of symmetry of the reflector.

3. The lighting system of claim 1 wherein the condensing lens comprises a pair of planoconvex lenses having their convex surfaces adjacent to one another and having a plane surface of one of said lenses positioned to receive rays from said reflector.

4. The lighting system of claim 3 wherein the combined focal length of the condensing lenses is equal to the spacing between the condensing lenses and the light source.

5. The lighting system of claim 1 wherein the fiber is a part of a fiber bundle comprising a central fiber surrounded by a plurality of peripheral fibers having cut and polished ends defining an inlet end perpendicular to said optic axis for intercepting converging rays from the condensor, said condensor focusing intercepted rays to a focal point positioned at the cut entry end of the fiber bundle.

6. The lighting system of claim 5 wherein the central fiber is larger in diameter than the peripheral fibers for carrying a greater amount of optical power.

7. The apparatus of claim 1 wherein an inlet end of said fiber is supported in a movable member for transferring the inlet end of the fiber bundle axially to a desired location to align the entry end of the bundle with the focal point of converging rays from the condensor.

8. The lighting system of claim 7 wherein a selectively adjustable means is provided for moving the end of the fiber adjacent the condensor laterally to align the entry end of the fiber with the focal point of the condensing lens.

9. The lighting system of claim 8 wherein the lateral adjustment means comprises a fiber optic coupler mount slidably mounted in a bracket with a threaded manually movable positioning member connected between the bracket and the fiber optic coupler mount for shifting the coupler mount laterally in the bracket to a selected position.

10. The apparatus of claim 1 wherein the columnating lens comprises an achromatic lens composed of two components with a predetermined focal length and said columnating lens is spaced from an outlet end of said fiber by a distance equal to the focal length of the columnating lens.

11. The lighting system of claim 1 wherein the reflector is either a paraboloid or an ellipsoid.

12. The lighting system of claim 1 wherein said fiber is contained in a fiber optic bundle composed of a plurality of optic fibers held together in a group having a cut and polished end defining an entry point positioned at the focal point of the condensing lens and at a remote point the fibers diverge from one another to provide a plurality of freely and independently movable ends for mounting in a variety of different positions and locations or at different elevations to produce special lighting effects.

13. The lighting system of claim 12 wherein the system is used for stage lighting and the outlet ends of said fibers are independently movable to different locations or elevations on the stage to produce high intensity stage lighting effects with a total power output of incoherent visible light of at least 1 watt of optical power.

14. The lighting system of claim 1 wherein the condensing lens comprises a gradient index lens.

* * * * *